March 28, 1950     D. B. DOOLITTLE     2,501,997
ARRESTING GEAR WITH RIBBON TYPE ENERGY ABSORBER
Filed June 3, 1948     3 Sheets—Sheet 3
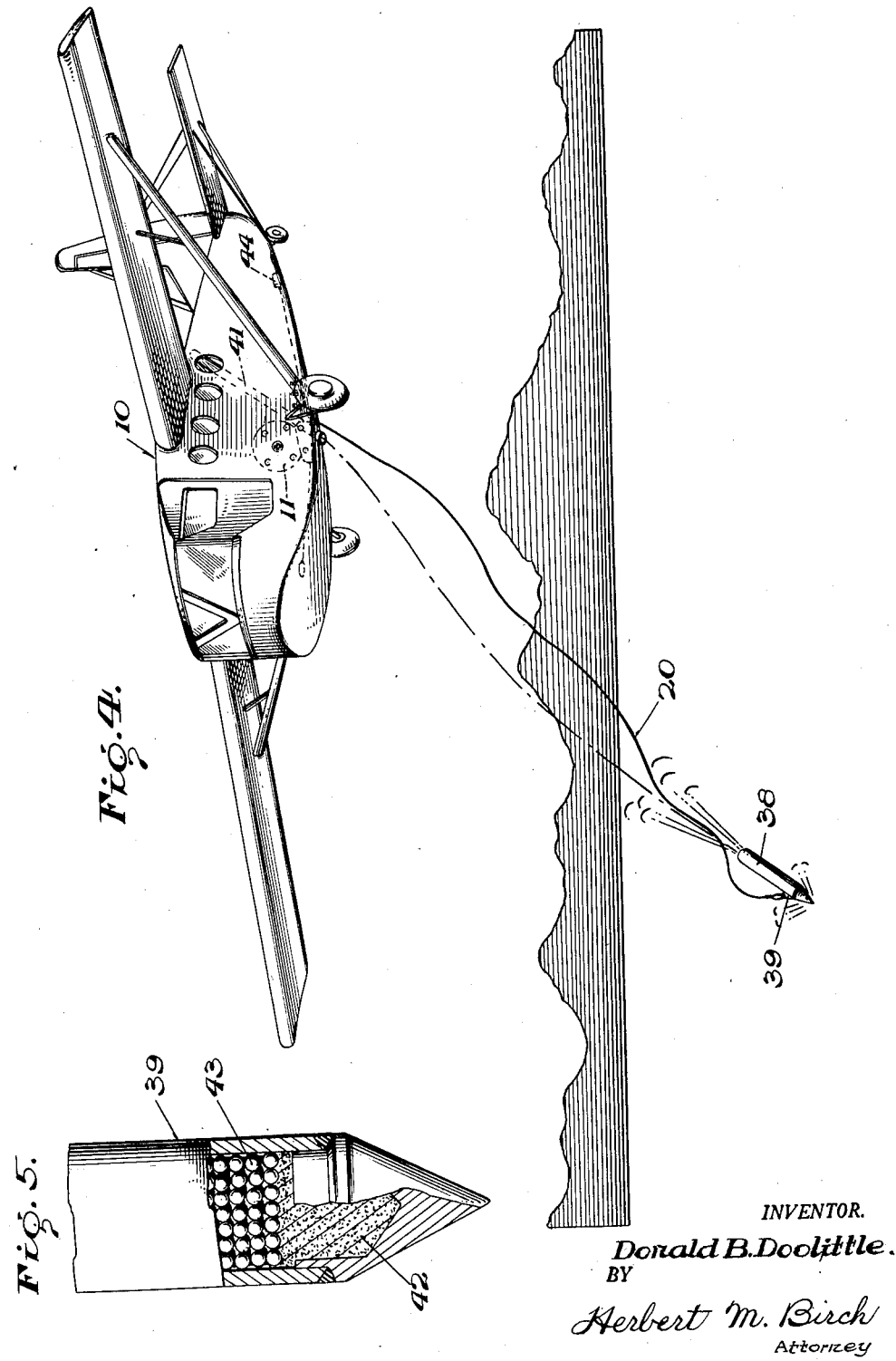
INVENTOR.
Donald B. Doolittle.
BY
Herbert M. Birch
Attorney Patented Mar. 28, 1950

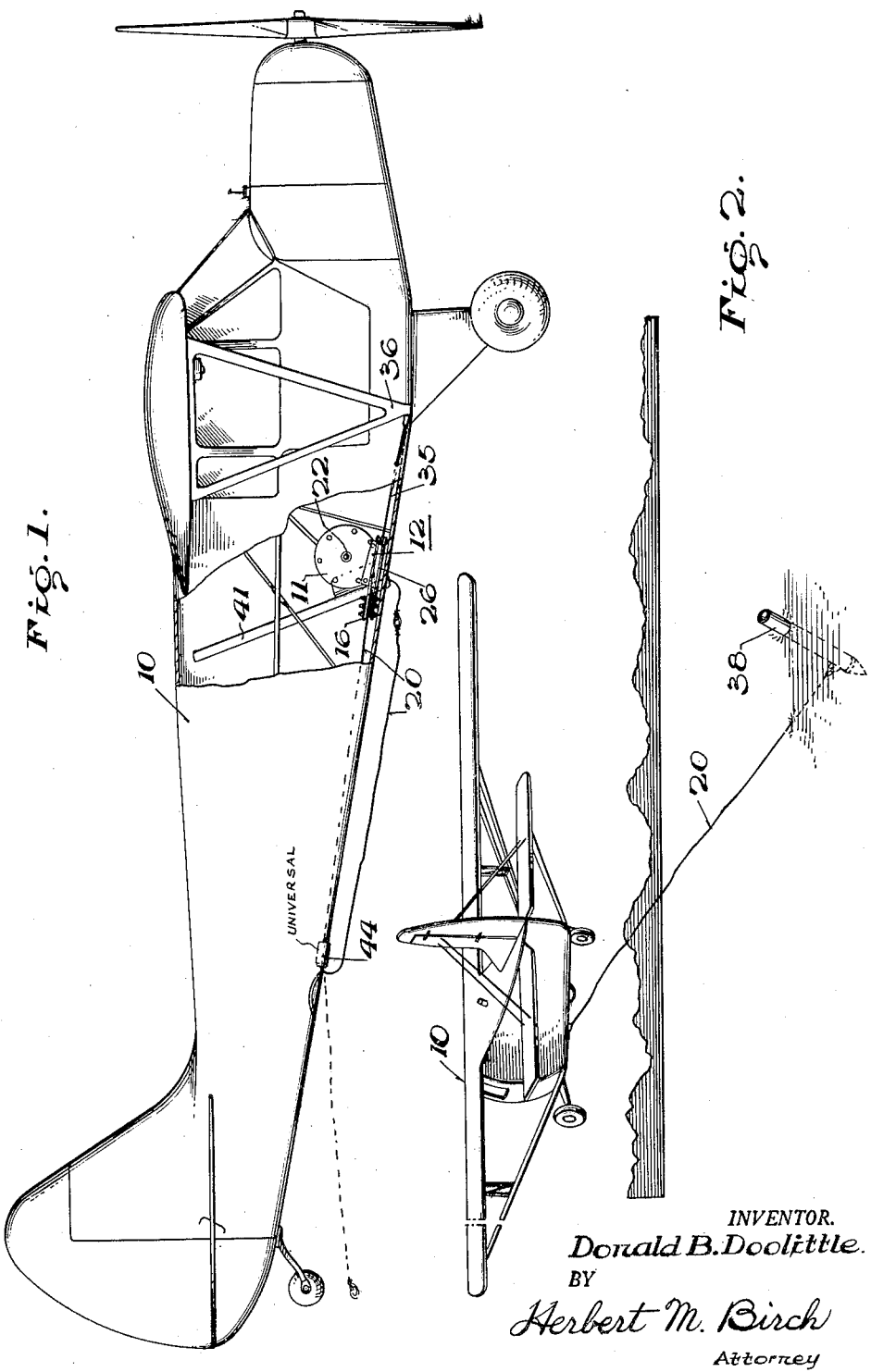

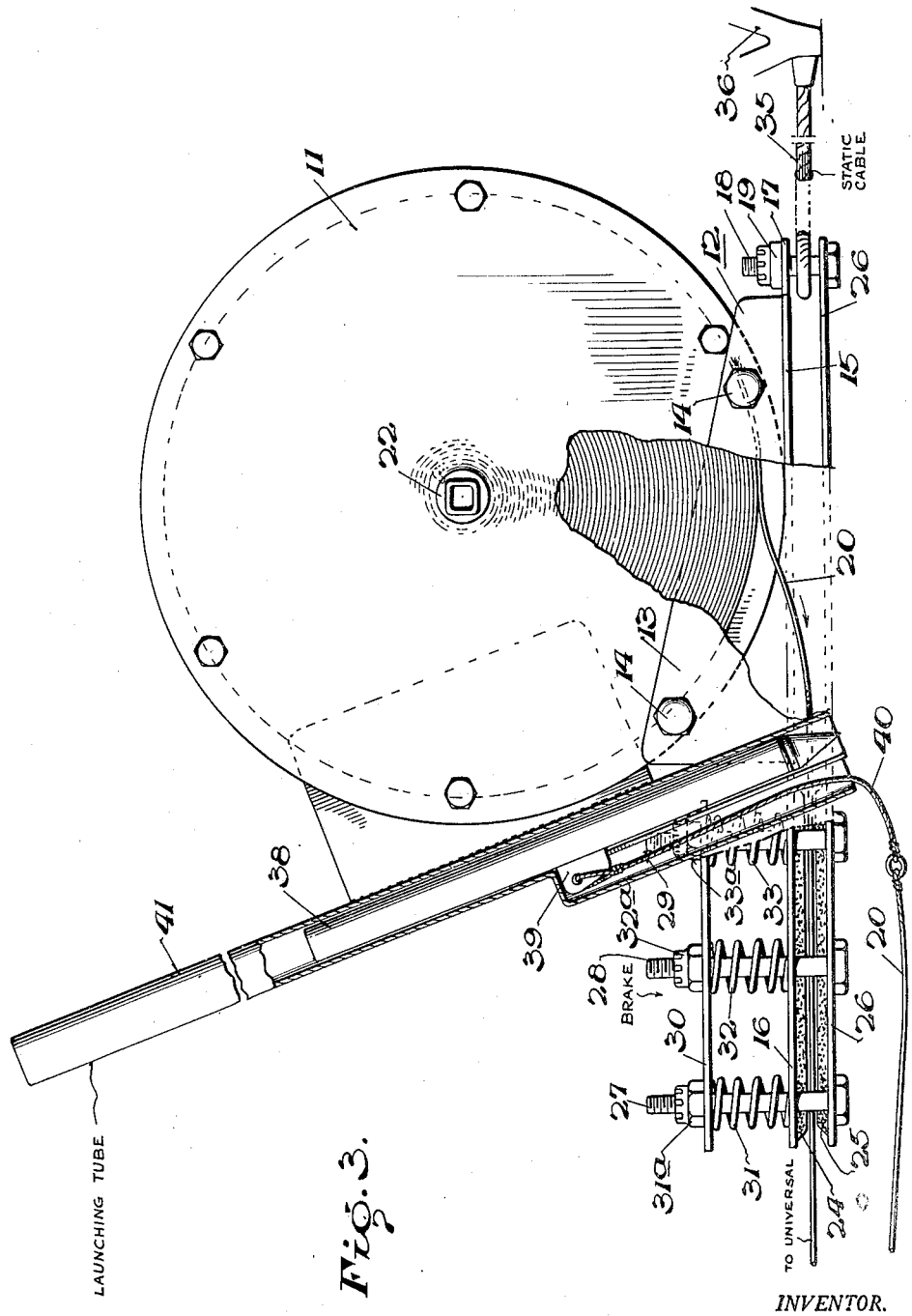

2,501,997

UNITED STATES PATENT OFFICE 2,501,997

ARRESTING GEAR WITH RIBBON TYPE ENERGY ABSORBER

Donald B. Doolittle, Earleville, Md., assignor to All American Airways, Inc., a corporation of Delaware Application June 3, 1948, Serial No. 30,948

3 Claims. (Cl. 244—110)

The present invention relates to arresting gear for aircraft and more particularly to a novel form of vehicle based arresting gear.

Broadly, the elements of the present arrangement comprise an explosive ejected ground engaging spike adapted to be fired forwardly and downwardly from the fuselage toward the nose of the supporting aircraft into the ground, means on the spike for coupling to the free end of an elongated flexible means, such as a tape or ribbon, preferably of metal, a winding and unwinding reel journalled for rotation in a housing, said housing being formed with an opening to permit passage of the tape or ribbon as it is unwound by firing the tethered spike into the ground and by the subsequent draw load imposed thereon by the forward motion of the carrying aircraft, and brake shoes operable at a predetermined time after firing the spike adapted to decelerate the forward motion of the aircraft by frictional engagement with the tape or ribbon as it is unwound.

The principal object of the invention is to provide a vehicle based ribbon type arresting gear.

Another object of the invention is to provide an emergency arresting gear adapted to be carried by the aircraft to be arrested or decelerated, which is durable and readily used over and over again as an important accessory of an aircraft.

A further object is to provide in combination with a ground anchoring spike, an aircraft based ribbon type energy absorbing means including brake means to retard the pull on the ribbon developed by the decelerating aircraft, and brake delay means operable to hold off the application of the brake means, until the ribbon is up to a predetermined speed.

Still another object is to provide in an aircraft based arresting gear, an efficient energy absorber, which is very light in weight, easily installed and economical to use and manufacture.

The above and other objects and advantages of the invention will appear more fully hereinafter from a consideration of the detailed description which follows, taken together with the accompanying drawings wherein only one embodiment of the invention is illustrated. It is to be understood, however, that the drawings are for the purpose of illustration only and are not intended to define the limits of the invention. To determine the limits of the invention, reference should be had to the appended claims.

In the drawings wherein like reference characters refer to like parts throughout the several views:

Figure 1 is a side view of an aircraft partly in elevation and partly in section to show the arresting gear mounted therein.

Figure 2 is a rear view of the aircraft after the ground anchoring spike has penetrated the ground and the energy absorbing ribbon has begun to decelerate the aircraft.

Figure 3 is a side elevation view partly broken away of the energy absorbing ribbon and its housing, with also a partial cross section of the firing spike mechanism.

Figure 4 is a front view of an approaching aircraft just after firing its ground engaging projectile, illustrating the initial forward projection of the spike toward and downward from the front of the aircraft.

Figure 5 is a partial cross section view of the nose end of the ground engaging spike, illustrating the explosive charge and reaction mass therein.

Referring in detail to the drawings and first with particular reference to Figures 1 and 3, there is shown an aircraft 10 for supporting the reel housing 11. The housing 11 is supported or cradled by a bracket 12 formed with side angle plates 13, which are secured to the housing 11 by suitable means, such as bolts 14. This bracket 12 is formed with a flat base plate 15, which plate is formed with a tape outlet slot and prolonged toward the rear of the plane body to form a brake shoe supporting plate, hereinafter numbered 16, while the front facing part of the bracket is formed with an apertured extension 17 for reception of a bolt 18 and nut 19 to aid in fastening the bracket to the aircraft.

The arrester ribbon or tape 20 feeds from the reel housing from around the spindle 22 through the slotted plate 15 and between the brake shoes 24 and 25. The leading portion of the ribbon 20 is preferably coated with grease or covered with wax sheets, not shown, for a predetermined extent to provide for a predetermined brake delaying action, as hereinafter explained. The end of the spindle shank is formed with a square opening to receive a crank for rewinding the ribbon after each use. This may be done manually or by automatic means, not shown. The brake shoes 24 and 25 are mounted opposite each other on plates, one of which is the plate 16 previously explained as a part of the bracket base 15 and the other is the plate 26, which like plate 16 connects to bolts 18 at one end and is operatively connected with the plate 16 at the other end by a plurality of oppositely arranged pairs of elongated bolts 27, 28 and 29. Obviously, each brake plate 16 and 26 and brake shoe 24 and 25 is formed with openings for the bolts 27, 28 and 29 to project through. Mounted over the threaded ends of each of these pairs of bolts 27, 28 and 29 is an equalizer plate 30 for a plurality of coil springs 31, 32 and 33 carried by each of the bolts. These springs are so positioned as to normally tend to expand between the underside of equalizer plate 30 and the upperside of brake plate 16, the plate 30 being held in place by nuts 31a, 32a and 33a, threaded on the ends of the bolts 22, 28 and 29. Thus the top brake shoe 24 is normally forced downward by the springs to cause frictional contact between the shoes and each face of the ribbon 20 therebetween.

It is important to firmly secure the assemblage to the aircraft structure and this may be done by bolting the bracket 12 to the floor of the fuselage by bolts 18 and the equilibrium of the apparatus is further assured by the static cables 35 looped at one end around each bolt 18 and anchored to a structural piece 36 of the aircraft.

The ribbon or tape 20 is caused to feed from the reel housing 11 by means of an explosive projected spike 38 formed with an apertured ear 39 connected to the free end of the ribbon 20 either directly or by a section of cable 40. The spike 38 is projected from a launching tube 41 by suitable means, such for example as an explosive charge 42 and a reaction mass 43 loaded in the spike, see Figure 5. Likewise, any other means may be provided for launching the spike 38, if desired.

As explained above the ribbon 20 feeds between the spring engaged brake shoes 24 and 25, and then rearwardly to and around a universal pulley or guide 44 toward the tail of the aircraft and back to connect with the spike 38 by the section of cable 40.

Operation

The operation of the apparatus should be clear from the foregoing description of the parts, but briefly the following will summarize the action of the same.

The charge 42 may be ignited by any suitable means and the spike 38 projected from the launching tube, see Fig. 4. As the aircraft flies forward toward the landing field the spike 38 after it penetrates the ground, see Fig. 2, soon is positioned rearwardly of the aircraft and a pull is exerted upon the ribbon 20 by the weight of the aircraft and the force of its forward motion.

Initially the grease or wax sheets over each side of the ribbon 20 cause slippage between the brake shoes and the ribbon surfaces, until the uncovered portion of the ribbon begins to feed between the shoes, whereupon the brake shoe actuating springs cause the shoes to take hold and retard the feed of the ribbon. When this occurs the aircraft will be gradually decelerated and brought to a stop on the landing field in gradual manner so as to not cause injury to the aircraft personnel.

Thus there is provided a vehicle based energy absorbing apparatus adapted to arrest the forward motion of a landing aircraft on which the same is mounted. The energy absorbing means of the apparatus comprises a flexible elongated strip and friction brake members operable to decelerate the aircraft in a gradual manner without transmission of shock to the occupants of the aircraft.

Without further description it is though that the advantages of the present vehicle based energy absorbing apparatus over the prior art will be apparent and while only one embodiment is illustrated, it is to be expressly understood the same is not limited thereto, as various changes may be made in the design and arrangement of the parts illustrated, as will now appear to those skilled in the art. For a definition of the scope or limits of the invention, reference should be had to the appended claims.

What I claim is:

1. For use in connection with a vehicle based ground anchor spike or the like, a reel mounted on an aircraft, means coiled on said reel and connected at its free end to said spike, a housing for mounting the reel and enclosing said means coiled thereon, an opening formed in the housing to permit passage therefrom of uncoiled sections of the means coiled on the reel, brake shoes constantly engaging said means and resisting the passage of the uncoiled sections thereof, and brake delay means covering a relatively short section of said means to render the shoes ineffective over said short section.

2. A vehicle based arresting gear comprising a ribbon, brake shoes mounted on each side of the ribbon, said ribbon being flexible and connected to a ground anchoring spike, reel means to permit winding and unwinding of said ribbon between the brake shoes, spring means adapted to maintain said shoes in braking engagement with the ribbon, and brake delay means between the surfaces of the ribbon and the ribbon engaging surfaces of the brake shoes for a portion of the ribbon.

3. A brake delay arrangement for use with aircraft base arresting gear, comprising a pair of opposed friction brake shoes biased into engagement with each other, a coil of flexible material adapted to be unwound between and constantly engaged by said brake shoes, and antifriction means between said flexible material and said brake shoes for a limited extent of the leading end of said flexible material adapted to reduce the friction between said shoes and the flexible material as the same begins to be uncoiled.

DONALD B. DOOLITTLE.

REFERENCES CITED

The following references are of record in the file of this patent:

UNITED STATES PATENTS

| Number | Name | Date |
|---|---|---|
| 669,551 | Rutherford | Mar. 12, 1901 |
| 940,512 | Christensen | Nov. 16, 1909 |

FOREIGN PATENTS

| Number | Country | Date |
|---|---|---|
| 361,720 | Great Britain | Nov. 26, 1931 |
| 533,475 | France | Dec. 10, 1921 |
| 91,454 | Switzerland | Mar. 9, 1921 |
| 103,585 | Switzerland | Jan. 18, 1923 |